United States Patent
Vezina

[11] Patent Number: 5,814,422
[45] Date of Patent: Sep. 29, 1998

[54] LEAD-ACID BATTERY WITH HANDLE

[75] Inventor: William K. Vezina, Stillwater, Minn.

[73] Assignee: GNB Technologies, Inc., Mendota Heights, Minn.

[21] Appl. No.: 886,263

[22] Filed: Jul. 1, 1997

[51] Int. Cl.$^6$ ................................ H01M 2/10
[52] U.S. Cl. .................... 429/187; 16/DIG. 15; 16/114 R
[58] Field of Search .............. 429/187; 16/DIG. 15, 16/114 R; 224/902; 294/903, 158; 220/759, 761, 762, 768

[56] References Cited

U.S. PATENT DOCUMENTS

| | | | |
|---|---|---|---|
| D. 292,696 | 11/1987 | Sahli ........................................... | D13/8 |
| 1,271,692 | 7/1918 | Ford . | |
| 1,472,997 | 11/1923 | Stevenson . | |
| 1,540,155 | 6/1925 | Wydom et al. . | |
| 1,588,502 | 6/1926 | Small . | |
| 1,697,063 | 1/1929 | Holland . | |
| 1,904,988 | 4/1933 | Severance . | |
| 1,993,682 | 3/1935 | Reetz ........................................ | 16/114 |
| 2,085,724 | 7/1937 | Black ........................................ | 16/114 |
| 2,289,824 | 7/1942 | Brogden .................................... | 229/52 |
| 2,951,615 | 9/1960 | Crane ........................................ | 220/94 |
| 3,016,136 | 1/1962 | Poupitch ................................... | 206/56 |
| 3,061,662 | 10/1962 | Toce et al. ............................... | 136/166 |
| 3,144,196 | 8/1964 | Sindars ..................................... | 229/52 |
| 3,167,808 | 2/1965 | Lindenberg et al. ..................... | 16/125 |
| 3,251,622 | 5/1966 | Miller ....................................... | 294/33 |
| 3,301,586 | 1/1967 | Lisiecki .................................... | 294/16 |
| 3,607,308 | 9/1971 | Dubble ..................................... | 99/138 R |
| 3,621,510 | 11/1971 | Rollins, Jr. ............................... | 16/114 |
| 3,695,418 | 10/1972 | Gwozdz ................................... | 206/45.33 |
| 3,956,022 | 5/1976 | Fox ........................................... | 429/187 |
| 4,013,819 | 3/1977 | Grabb ....................................... | 429/187 |
| 4,029,248 | 6/1977 | Lee ........................................... | 224/45 F |
| 4,142,660 | 3/1979 | Culbertson .............................. | 224/45 P |
| 4,448,863 | 5/1984 | Terrell ...................................... | 429/178 |
| 4,632,888 | 12/1986 | Kump et al. ............................. | 429/187 |
| 4,673,625 | 6/1987 | McCartney .............................. | 429/187 |
| 4,727,620 | 3/1988 | Gummelt ................................. | 16/115 |
| 5,232,796 | 8/1993 | Baumgartner ........................... | 429/187 |
| 5,242,769 | 9/1993 | Cole et al. ............................... | 429/187 |
| 5,283,137 | 2/1994 | Ching ....................................... | 429/187 X |
| 5,415,956 | 5/1995 | Ching ....................................... | 16/114 R X |
| 5,440,785 | 8/1995 | McDonald ............................... | 429/187 X |
| 5,670,274 | 9/1997 | Forrer ....................................... | 429/187 |

FOREIGN PATENT DOCUMENTS 1290147  9/1972  United Kingdom .

*Primary Examiner*—Anthony Skapars
*Attorney, Agent, or Firm*—Leydig, Voit & Mayer, Ltd.

[57] ABSTRACT

A lead-acid storage battery, such as a starting, lighting and ignition battery, includes a handle having preferably wedge-shape hook ends which are inserted into a belt loop typically molded into the end walls of the battery container, the hook ends engaging spring pawls associated with the belt loop which allow the handle to be inserted into the battery and which engage the hook ends when the handle is moved into the service position for transporting the battery.

8 Claims, 3 Drawing Sheets

# LEAD-ACID BATTERY WITH HANDLE

FIELD OF THE INVENTION

This invention relates to electric storage batteries and, more particularly, to such batteries having handles.

BACKGROUND OF THE INVENTION

Starting, lighting and ignition ("SLI") batteries such as are typically used in automotive and other applications are heavy, cumbersome and often require two hands for carrying. Over the years, handles have been proposed and designed for a variety of batteries, such as, for example, SLI lead-acid automotive batteries, marine batteries, and the like.

Providing batteries with handles has become important, particularly for SLI automotive batteries because of the manner of purchase. It is thus quite common for a consumer to purchase a battery from a retailer and then install the battery. Therefore, the ease by which the battery can be carried becomes important. Additionally, it is useful to employ a handle to facilitate lifting the battery out of the vehicle.

Substantial attention has been addressed to providing handle designs for all kinds of batteries. Such handle designs include U.S. Pat. No. 5,232,796 to Baumgartner, assigned to the assignee of the present invention, which utilizes a handle capable of being locked in an upright position and yet, after installation into a vehicle or the like, can be readily moved to a service position alongside the battery. U.S. Pat. No. 4,752,543 to Anderson et al. discloses a battery having a low profile cover which includes a movable handle that is an integral part of the cover and which is stowable in a recess in the cover.

Additional prior patents showing a variety of handle designs include the following U.S. Pat. No. : 1,472,997 to Stevenson; U.S. Pat. No. 1,540,155 to Wydom et al.; U.S. Pat. No. 1,588,502 to Small; U.S. Pat. No. 1,904,988 to Severance; U.S. Pat. No. 1,993,682 to Reetz; U.S. Pat. No. 2,085,724 to Black; U.S. Pat. No. 3,167,808 to Lindenberg et al.; U.S. Pat. No. 3,621,510 to Rollins; U.S. Pat. No. 4,013,819 to Grabb; U.S. Pat. No. 4,632,888 to Kump et al.; U.S. Pat. No. 4,673,625 to McCartney et al.; and U.S. Pat. No. 5,440,785 to McDonald. Additionally, the aesthetics of a battery with the handle configuration has been considered, as is evident from U.S. Pat. No. Des. 292,696 to Sahli.

It is perhaps not surprising that so much attention has been addressed to designing handles for batteries. Thus, there are many diverse design criteria which need to be taken into consideration. Of course, the handle design must be strong enough to bear the weight of the battery; and the design of attachment to the battery must likewise be sufficiently robust so that damage to the battery during transportation does not occur, e.g., the handle pulling out of its attachment mechanism. On the one hand, the method of attachment of the handle needs to be straightforward, most preferably being capable of being installed automatically. Yet, on the other hand, the handle design must not be susceptible to the handle being undesirably detached, particularly when the battery is being transported via the handle.

Additionally, it would be desirable to provide a handle which cannot be pulled to one side of the battery, as might occur, for example, when the user is attempting to reach the handle to pull the battery out of the automobile or other vehicle. Further, it would be desirable to provide a handle construction in which the ends of the handle do not create a non-uniform load on the handle ends, which non-uniform load could result in a tearing effect on the handle.

Finally, all of these diverse criteria must be satisfied in a cost-effective manner so as not to significantly increase manufacture of the component parts of the battery and handle, nor significantly increase the cost of assembly. More particularly, while consumers desire batteries with handles in many applications, the value-added benefits are often carefully appraised by the potential purchaser so that an unduly expensive handle design would be unacceptable to many purchasers.

Accordingly, despite the considerable effort in this area, there still exists a need for a battery having a handle design capable of satisfying the diverse criteria.

It is accordingly an object of the present invention is to provide a battery wherein the handle may be readily attached to the battery and assembled into position, yet which is not susceptible to the handle being inadvertently detached, particularly in use. A related and more specific object lies in the provision of a handle design which is amenable to assembly by automation.

Another object of the present invention provides a battery and handle design having ample strength for use in transporting the battery without any significant likelihood of damage to the handle or the battery.

A still further object of this invention provides a battery and handle design which can be readily molded in a cost-effective fashion.

Yet another object provides a handle construction that is not free to pivot side-to-side after attachment to the battery and wherein the force across the cross-sectional area of the handle is uniform.

Other objects and advantages will be apparent as the following description proceeds taken in conjunction with the accompanying drawings.

SUMMARY OF THE INVENTION

In accordance with the present invention, the battery, preferably the container, includes molded cantilever spring pawls forming a belt loop for receiving a handle and the handle ends each have a wedge-shaped hook which can be inserted by pushing downwardly so that the spring pawls move outward until the handle hook has passed the pawls. At that point, the pawls snap back against the handle above the hooks. The handle is free to slide vertically downward until the handle is nested on top of the battery and back upward until the hooks catch on the pawls. The belt loops on each side of the battery, formed by the cantilever spring pawls, are sized complementally with the ends of the handle so that the handle is not free to move side-to-side relative to the battery after insertion.

In this fashion, a cost-effective, but reliable, handle is provided.

DETAILED DESCRIPTION OF THE INVENTION

Figure 1:
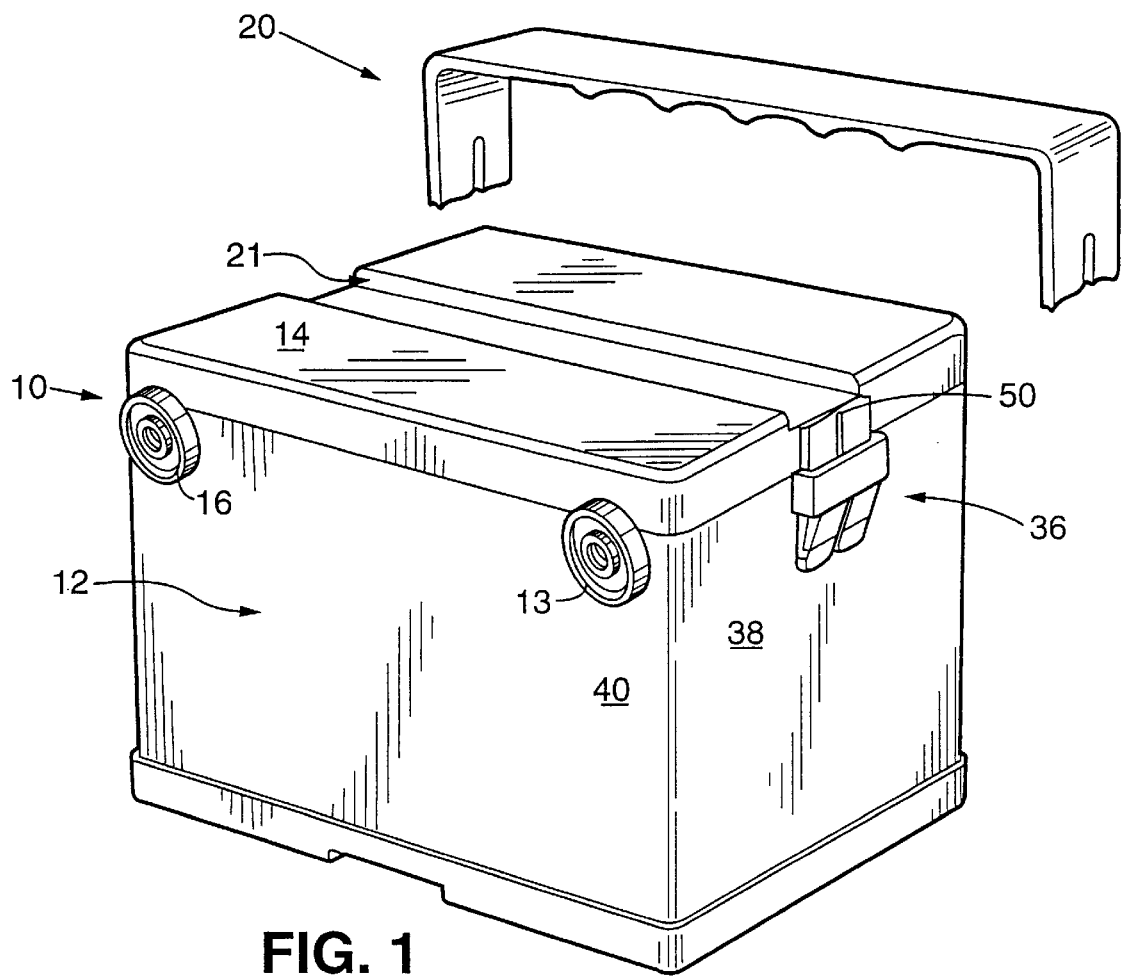
FIG. 1 is an isometric view of one embodiment of a battery and handle according to the present invention and showing the handle in its upright service position.
Figure 2:
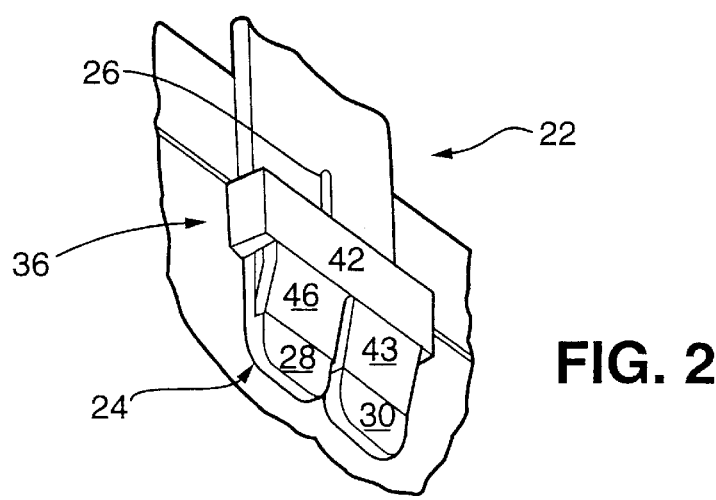
FIG. 2 is a partial, enlarged isometric view of a handle end and showing the handle and the handle attachment structure on the battery container.

FIG. 1 shows a preferred embodiment of the battery of the present invention indicated generally at 10. The battery 10 includes a container 12 having a cover 14 attached thereto by conventional means and a positive side terminal 16 and a negative terminal 18. As to the container, cover, manifolds and terminal configurations and locations, these components can be varied as desired. A variety of configurations are known and may be utilized in the present invention. Similarly, the plates, separators, and other aspects of the internal configuration of the battery may be varied as desired, numerous configurations being known in the art.

The battery and handle that will be described herein are particularly suitable for use in conventional lead-acid electric storage batteries used for SLI applications, including automotive, marine, recreation and other vehicles and applications. However, as should be appreciated, the battery and handle configuration of this invention can be utilized with other types of batteries as is desired.

Figure 3:
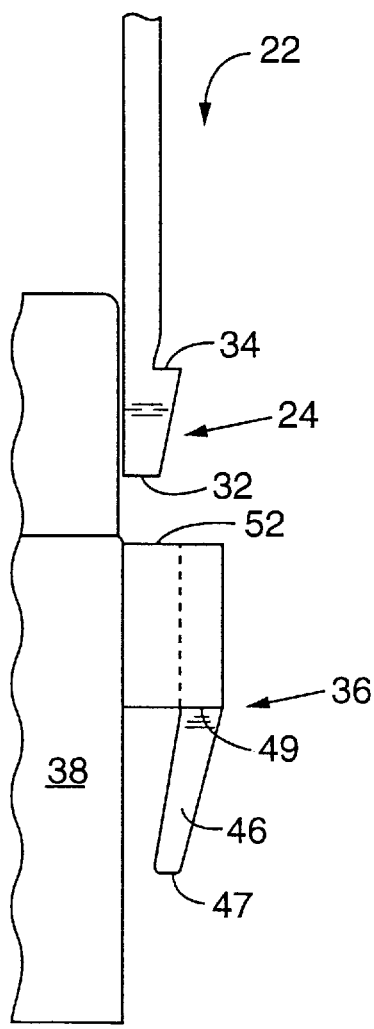
FIG. 3 is a partial side elevation view of a battery container and handle, according to the embodiment shown in FIG. 1, and showing the position of the handle prior to insertion into the handle attachment structure formed on the battery container.

As can be seen in FIGS. 1–4, the handle 20 has a wedge-shaped hook 22 at each of the handle ends. In the illustrative embodiment, the handle 20 nests in a recess 21 in cover 14 when not in use. Thus, the handle end shown generally at 22, in the illustrative embodiment, includes a wedge-shaped hook end shown generally at 24, bifurcated by notch 26 into spaced, hook ends 28 and 30. Preferably, and as perhaps can be best seen in FIG. 3, the hook ends 28 and 30 are angled such that the thickness of these wedge-shaped hook ends lessen at their extreme bottom end, indicated at 32 in FIG. 3, relative to the interior top end 34 of the hook (as is also seen in FIG. 3). This wedge shape facilitates the insertion of the handle, upon assembly with the battery, as will be described in more detail hereinafter. Any angle desired can be utilized for the hook end, the principal criteria simply being to facilitate installing the handle. By way of an illustrative example, and as is preferred, it has been found that a 10° angle (to vertical) is suitable. Similarly, and as is best seen in FIG. 3, the interior top end 34 of the hook end 24 is downwardly and inwardly angled (e.g., 10° to horizontal) so as to minimize the possibility of the handle being detached, as will be discussed hereinafter.

Yet another aspect of the preferred embodiment of the present invention positions the handle so as to span the longer dimension, i.e., the length, of the battery 10. The ends 22 of handle 20, upon assembly, are thus located adjacent the end walls 38 of the battery 10. However, if desired, the handle used in the present invention can, of course, span the shorter dimension (width) of the battery 10 so that the handle ends 22 are positioned on what are generally termed as the side walls of the battery, as indicated at 40.

From a functional standpoint, the handle 20 can be configured as desired, consistent with providing adequate strength for the function. Thus, if desired, the handle 20 can be provided with a user grip area with a thickness which allows the user to comfortably carry the battery 10. Any configuration desired can be used for the grip area. The material of construction can be any desired, useful materials include polypropylene and ethylene-propylene copolymers.

The most preferred embodiment of this invention positions the handle, after assembly, at or near the center of gravity of the battery 10 to facilitate carrying the battery by the user. However, while it is certainly preferred to locate the handle on the center of gravity of the battery for ease of use, the positioning of the handle relative to the center of the battery can be varied as considered appropriate for the particular application.

In the illustrative embodiment, and as is best shown in FIGS. 1–4 and 6–7, the container 12 includes handle attachment structure. Pursuant to this invention, the handle attachment structure on the container 12 is indicated, in general, at 36.

In the illustrative embodiment, this container attachment structure includes a belt loop 42 and a cross-piece 44 (FIG. 3), sized and positioned to accept notch 26 of the handle ends 22. Cantilever spring pawls 46 and 48, preferably molded integrally with belt loop 42, are designed to accept, upon insertion, hook ends 28 and 30.

Figure 4:
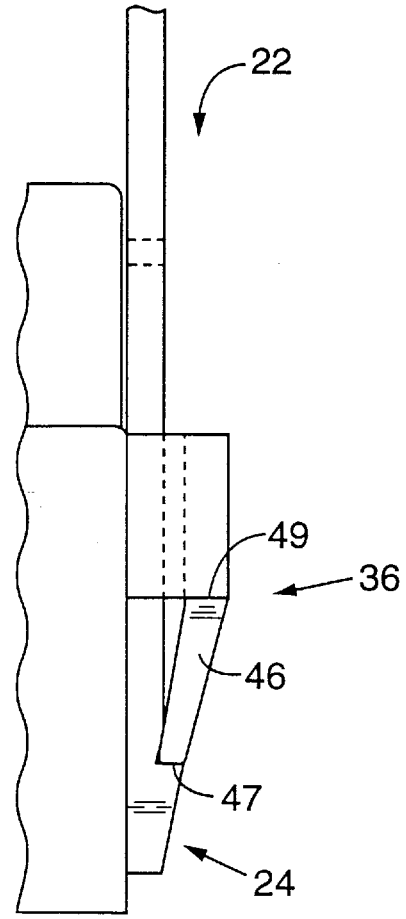
FIG. 4 is a partial side elevation view similar to FIG. 3 and showing the handle after insertion into the handle attachment structure molded into the battery.
Figure 5:
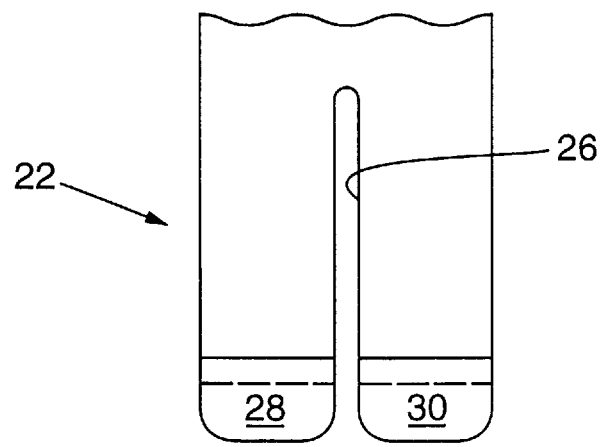
FIG. 5 is a partial front elevation view of the handle end.
Figure 6:
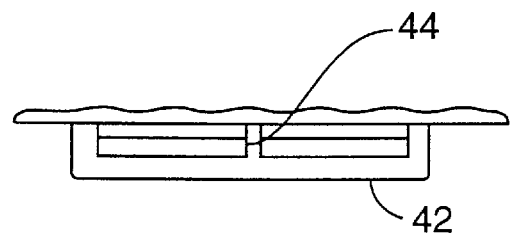
FIG. 6 is a partial top view of the battery container and showing the handle attachment structure.
Figure 7:
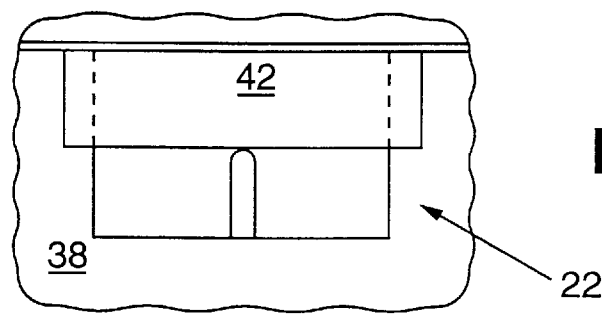
FIG. 7 is a partial front elevation view and further showing the handle attachment structure.

As can be best seen in FIGS. 3 and 4, the cantilever spring pawls 46 and 48 are biased toward container end walls 38 and are spaced therefrom to allow hook ends 28 and 30 to be inserted by downward force. Thus, as may be appreciated, cantilever spring pawls 46 and 48 are forced outwardly as the wedge-shaped hook ends 28 and 30 are forced downwardly into position. These pawls then spring back into their biased position as shown in FIGS. 3 and 4.

The cantilever spring pawls 46 and 48 thus allow suitable flexing for insertion of the hook ends 28 and 30 without stressing the plastic material from which these pawls are made to the point where the cantilever hooks do not spring back fully after the hooks have passed. Additionally, and in the preferred embodiment, such spring pawls include angled tips 47 (i.e., the bottom extremity of the pawls shown in FIG. 3) that match the hook angle (i.e., the preferred angle being 10° from horizontal) so that the pawls cannot slip out of the hooks under load, and have a generally trapezoidal shape (thicker at the base 49 than the top 47 as seen in FIGS. 3 and 4) to keep the pawls from buckling under load (viz., under the weight of the battery).

The combined effect of the preferred embodiment is to cause the handle, when under load, to be biased against the container. Additionally, the handle hook and pawl abutting surfaces, in effect, dig into each other so as to minimize the possibility of displacement or detachment.

Cross-piece 44 divides belt loop 42 into two areas each sized to accept the respective hook ends and being formed and positioned to accept notch 26. In this fashion, after insertion into the assembled position, handle 20 will not move side-to-side relative to the container and cross-piece 44 cooperates to prevent such undesired movement. Such side-to-side movement can result in non-uniform stress on the handle ends, and, ultimately, damage or failure of the handle, whether nested in the cover as shown in FIG. 1 or not. Alternatively, the battery cover could serve as, in effect, the stop to limit the downward handle motion. In this instance, the cross-piece 44 would not play a role in limiting downward handle motion. The principal features of such cross-piece 44 would then be to provide additional strength for the belt loop 42 and to give more surface area to prevent side-to-side motion of the handle.

As may be appreciated, after being assembled into position, handle 20 can be moved downwardly until the notch top 50 abuts the top 52 (FIG. 3) of cross-piece 44. By appropriate sizing, the downward or rest position of the battery handle 20 can be varied as desired.

Thus, as has been seen, the present invention provides a handle and battery structure which can be readily made in a cost-effective manner and which provides a reliable handle which has been found to have uniform force across the hook ends. Undesired side-to-side movement is prevented. While the illustrative embodiment provides a preferred handle and battery attachment structure for the handle, the invention is not so limited. It is the intention to cover all modifications and alternatives falling within the scope of the appended claims. Thus, for example, while the handle attachment structure is shown as being molded to the container, it should be appreciated that this could be molded onto the cover, if desired. Similarly, the container could be molded such that the outside of the belt loop is flush with the outside of the container wall. This would require a recessed rectangular area to accommodate the handle ends and the pawls. Also, the handle attachment structure referred to as the "belt loop" is not limited to the size and shape depicted herein. Thus, the ends of the belt loop illustrated herein could be extended outward, or adjacent, to the extremities of the end or side walls of the battery if desired, for aesthetic, manufacturing, or structural purposes. For example, extending the belt loop to the extremities of the particular battery walls allows such "extended belt loop" to serve as, in effect, "bumpers" as the batteries move along the assembly process. In any event, in accordance with the invention, the extended belt loop should include a section or compartment sized to minimize undesired side-to-side movement of the handle as discussed herein. Still further, while the handle end notch and the cross-piece provide the desirable functions described herein, it should be appreciated that a suitable alternative and modification within the scope of this invention can comprise a belt loop having no cross-piece 44, and the handle end notch 26 could likewise be omitted. Such an embodiment could be used to provide a narrower handle, if so desired.

I claim:

1. An electric storage battery comprising a container having side and end walls, a cover having opposed side and end walls attached to the respective side and end walls of the container, said container having handle attachment structure comprising a belt loop dimensioned to accept a handle and at least one spring pawl for engaging a handle, and a handle having a service and a rest position and having hook ends contained in said belt loop, said hook ends being sized and positioned to abut against said pawl in the service position, the handle and belt loop being dimensioned to restrict side-to-side movement of the handle.

2. The battery of claim 1 wherein said battery is a lead-acid battery.

3. The battery of claim 2 wherein said lead-acid battery is a starting, lighting and ignition battery.

4. The battery of claim 3 wherein said handle is attached to said container adjacent the center of gravity of the battery.

5. The battery of claim 4 wherein said handle attachment structure is molded on the end walls of the container.

6. The battery of claim 3 wherein said belt loop is divided by a cross-piece, said handle ends are notched such that the cross-piece serves as a stop preventing downward movement of the handle, each handle end having a pair of hooks and engaging a separate spring pawl.

7. The battery of claim 6 wherein said spring pawls are biased toward the container end wall and have an inner surface angled relative to the vertical, and said hook ends have a wedge shape facilitating downward movement of the handle past the spring pawls.

8. The battery of claim 5 wherein said cover has a recess and said handle nests in the recess when in the rest position.

\* \* \* \* \*